United States Patent [19]
Jefferson

[11] Patent Number: 5,241,589
[45] Date of Patent: Aug. 31, 1993

[54] SYSTEM AND METHOD FOR IMPLEMENTING TELEPHONE DIALING RULES

[75] Inventor: Darrell E. Jefferson, San Jose, Calif.
[73] Assignee: Xerox Corporation, Stamford, Conn.
[21] Appl. No.: 856,005
[22] Filed: Mar. 20, 1992
[51] Int. Cl.⁵ .............................................. H04M 1/27
[52] U.S. Cl. ................................. 379/355; 379/216
[58] Field of Search ........................ 379/355, 356, 216

[56] References Cited
U.S. PATENT DOCUMENTS
4,682,357  2/1987  Irino ................................... 379/356
5,099,512  3/1992  Shigami et al. ................. 379/216 X Primary Examiner—James L. Dwyer
Assistant Examiner—Creighton Smith
Attorney, Agent, or Firm—John M. Kelly

[57] ABSTRACT

A system and method for automatically examining and correcting telephone numbers to increase the likelihood of establishing communication between a local device, such as a fax card or modem, and a remote device. Proposed telephone numbers are identified and compared against user specified comparison templates to determine if the proposed numbers are proper for establishing communication. If they are, they are approved for dialing. However, if they are not, the proposed numbers are modified according to user specified rules which form output templates. The modified number is then approved for dialing. The system is beneficially implemented using a computer which stores a set of comparison templates and a set of associated output templates in memory. The computer compares a specified number, corrects it as required, and applies it to the local device for dialing.

9 Claims, 3 Drawing Sheets

;Internal

![0189], 3N

[4],[9],[4], ![0189], 3N     =>   4R

0:1[1],[4],[1],[5],[4],[9],[4], ![2222], 3N     =>   4R

;Outside local

[9], 0:1[P], ![01], 6N

![01], 6N     =>   [9],[P],7L

0:1[1],[4],[1],[5], ![01], 6N     =>   [9],[P],7R

;Long Distance

SYSTEM AND METHOD FOR IMPLEMENTING TELEPHONE DIALING RULES

The present invention relates to automatic telephone dialing systems.

BACKGROUND OF THE PRESENT INVENTION

Automated telephone numbers dialers are well known. With one type of such dialer a personal computer sends a telephone number to a local device, such as a modem or fax card, that then automatically dials that number. While some dialers may require that a phone number be specified via a keyboard concurrently with dialing, with more advanced dialers the phone number can be entered in many other ways. For example, a set of phone numbers can be stored in a data file and then recalled for display on a display screen as needed. An operator may then select a number or numbers which are then sent to the local device for dialing. Even more advanced systems are possible, such as fully automatic systems which automatically dial stored numbers without an operator being present.

Telephone dialers having a system operator that specifies a number concurrently with dialing are highly efficient in establishing communications. This is because the system operator can use the audible feedback provided by the telephone system. Such feedback typically includes dial tones, busy signals, prompting beeps, machine answering tones, and recorded comments ( . . . the number dialed is not a working number, please consult your directory . . . ). Additionally, while less common now then in the past, a telephone operator may provide interactive dialing assistance, such as by informing the system operator about such problems as a lack of a country designator or by providing missing area code information.

However, the more advanced automated dialers may not be able to utilize the available feedback information. This is because a phone number may be dialed automatically without a system operator present, the dialing system may not provide a means for monitoring the dialing process, or the telephone system being used may not provide feedback for the telephone number dialed. Without feedback, the automated dialing system may not be aware that essential information was left off of a dialed phone number; examples of missing information include billing charge codes, access codes required to obtain an external line from a private phone system, a "1" before the area code when dialing long distance, or foreign country access codes. Even if all dialing information is present, a phone number may contain information that, while needed in some circumstances, is not needed to make that call on the particular telephone system being used: examples include an area code with a local telephone number, a local prefix with an inside call on a private system, or foreign country access number information with a call that is not international.

In view of the above, it would be desirable to have a system and method of examining telephone numbers before dialing, and, if problems are detected, of modifying those numbers so as to enhance the chances of successfully establishing communication. Beneficially, phone numbers would be examined and modified based upon the content of the number itself, the dialing requirements of the automated number dialer, and the rules of the particular telephone system used to make the call.

SUMMARY OF THE PRESENT INVENTION

Therefore, in accordance with the present invention, there is provided a dialing system and method (1) for examining a proposed telephone number; (2) for determining if that number meets user specified dialing rules selected to assist in establishing communication with the desired receiving unit; and (3) for modifying the proposed telephone number if it does not fulfill those rules so as to enhance the likelihood of establishing communications. If the proposed number does not meet the specified dialing rules because it includes unneeded information, the proposed number is modified to contain only the required information. If the proposed number lacks necessary information, that information is determined, if possible, according to specified rules and that information is then added to the proposed number.

The method includes the steps of specifying a set of comparison templates that define possible telephone numbers, and of associating at least one of those comparison templates with an output template that specifies how a telephone number that matches the associated comparison template should look. A proposed telephone number is compared against the comparison templates; if a match occurs the proposed number is modified according to the output template.

The inventive system operates by modifying proposed telephone numbers to assist in enabling communication between a local dialing device and a remote unit using a telephone system having specific dialing requirements for reaching that remote unit. The system includes a set of comparison templates used to match proposed telephone numbers, at least one output template for specifying how a proposed number should be modified so as to increase the likelihood of successfully establishing communications, and a means of associating a first of the comparison templates with the output template. If a proposed telephone number matches the first comparison template, the proposed telephone number is modified according to the output template. Beneficially, the system also includes a way to input proposed telephone numbers for comparison and a way of applying modified numbers to the local device. Beneficially, the system further includes a central processing unit (CPU) controlling system operation.

BRIEF DESCRIPTION OF THE DRAWINGS

Other aspects of the present invention will become apparent as the following description proceeds and upon reference to the drawings, in which:

FIG. 3 presents a sample script routine according to the principles of the present invention.

DETAILED DESCRIPTION OF THE ILLUSTRATED EMBODIMENT

The present invention is directed to a system and method of examining proposed telephone numbers to determine if they meet the requirements of an associated telephone system to establish communication with a remote unit. If a proposed number does not, that number is corrected according to preselected rules. However, if a number meets the requirements, the number is dialed. In general, if a number contains excess information, such information is removed before dialing, while if a number requires more information, that information is added before dialing if it can be determined using specified rules.

The present invention is beneficially practiced using a low cost personal computer and a local telephone-dependent device, such as a fax card or a modem. To assist in enabling an understanding of the present invention, it is described in connection with the computer/fax card system 2 illustrated in FIG. 1. However, it is to be clearly understood that the present invention is not limited to such a system, but rather it covers all alternatives, modifications, and equivalents found within the scope of the appended claims.

Figure 1:
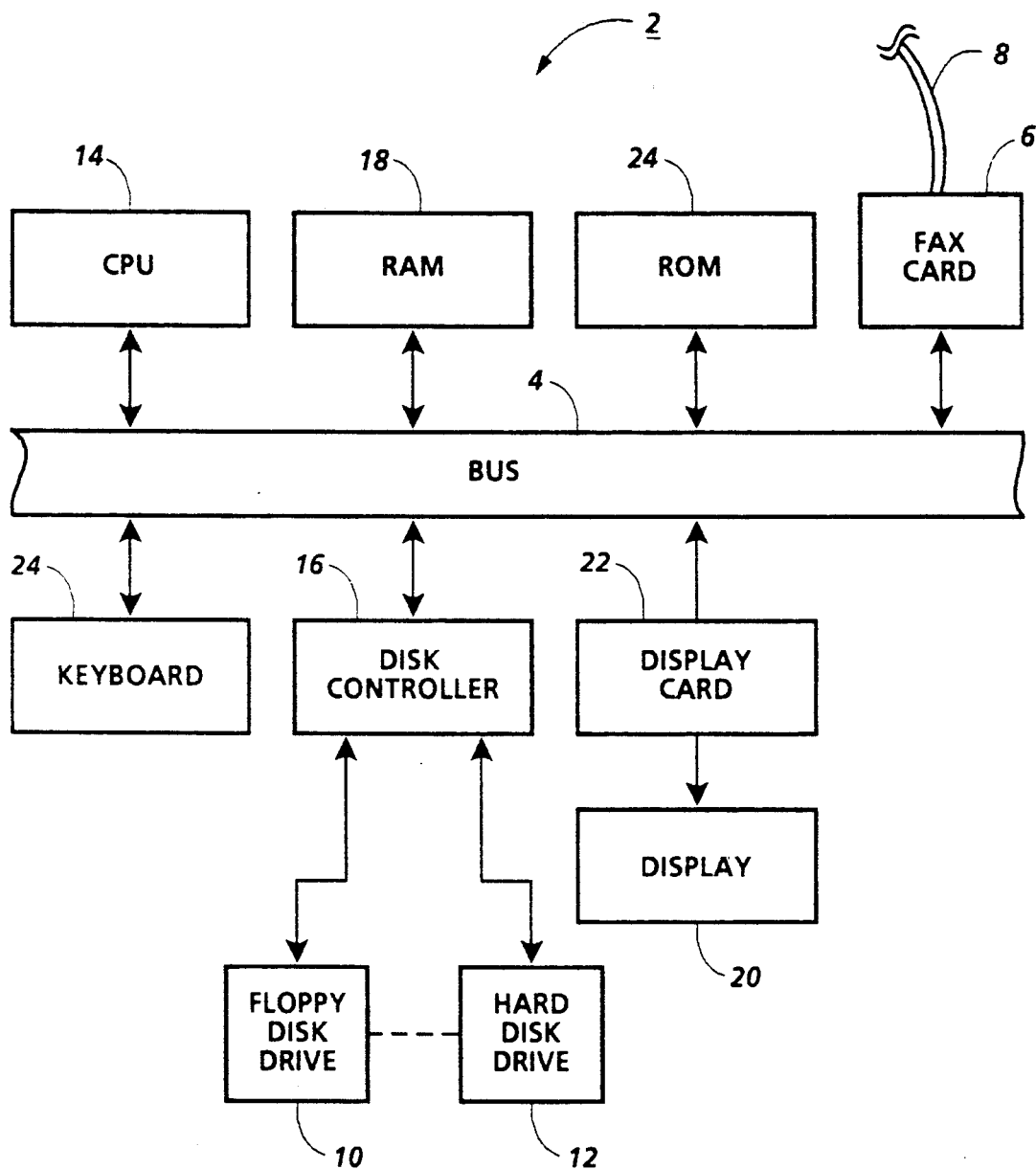
FIG. 1 provides a simplified block diagram of a computer and fax card system suitable for practicing the present invention.

Referring now to FIG. 1, the system 2 includes a bus 4 to which a fax card 6 is connected. The fax card has the capability of dialing a phone number using a telephone line 8. The telephone line 8 connects to an external telephone system (not shown) which may take many forms, such as a private PBX-type system or the local public telephone system. The external system dictates how the fax card 8 must dial a phone number to make connections with a remote unit (also not shown). When the fax card 6 is provided with a phone number, a dialer within the fax card dials the number.

While many methods of supplying the fax card with numbers to dial exist, for explanatory purposes it will be assumed that the fax card receives phone numbers via the bus 4, and that the phone numbers are stored in an existing data base file accessed via either a floppy disk drive 10 or a hard disk drive 12. To send the phone number to the fax card, it will be assumed that the computer's CPU 14, operating according to software instructions, causes a disk controller 16 to load the data base file into the system's RAM 18 (random access memory), and that the phone numbers are displayed on a CRT 20 via a display card 22. A system operator then selects, via a keyboard 24, one or more numbers on the CRT 20, and those numbers are then applied to the fax card. In the assumed system, the telephone number selected by the operator is processed, as described below, before being applied to the fax card.

Figure 2:
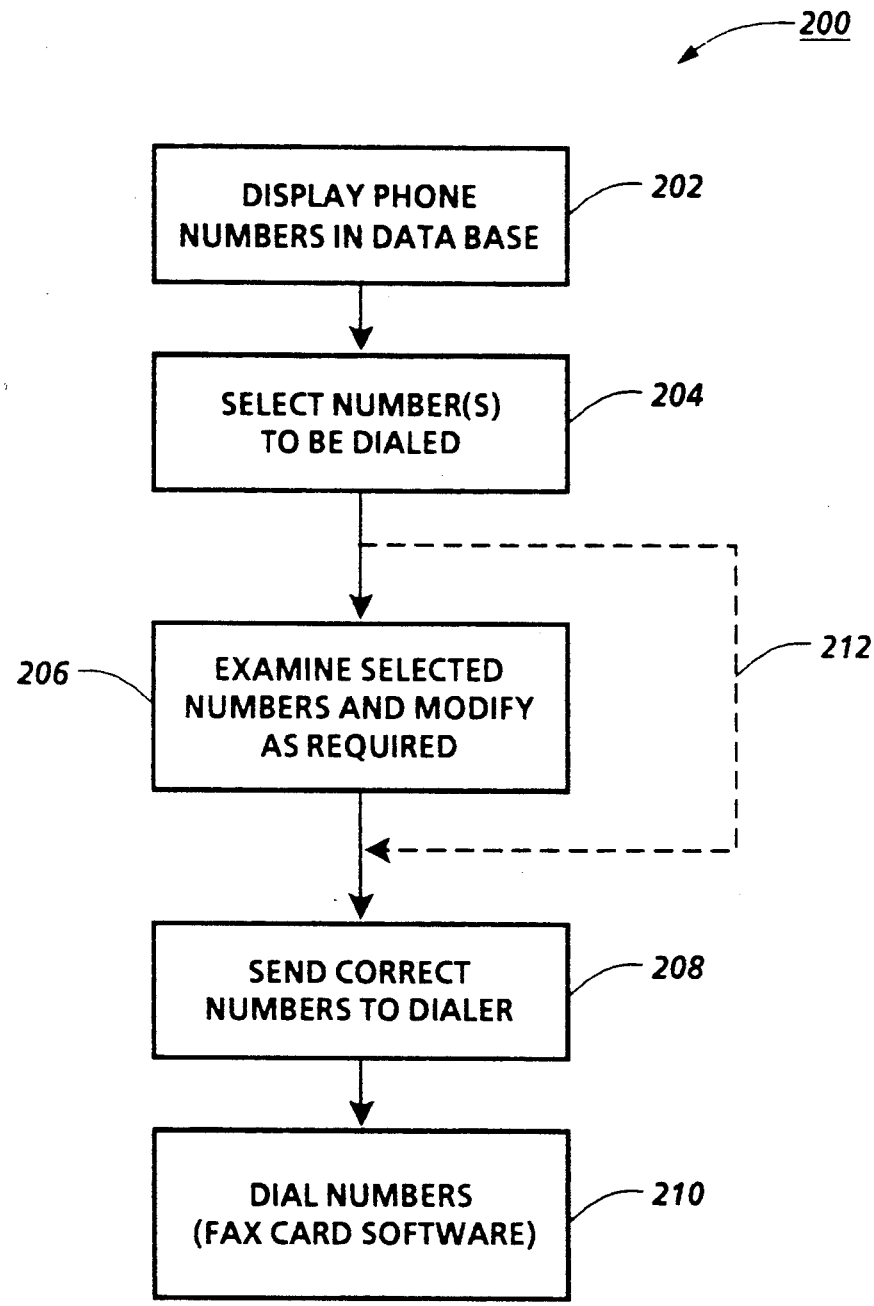
FIG. 2 illustrates how a dialing program according to the principles of the present invention might interact with a fax card operating program.

The steps required to dial a telephone number according to the assumed system using the principles of the present invention are illustrated in FIG. 2. A software program causes phone numbers in a data base file to be displayed on the CRT 20, step 202. Using a pointer, such as a light bar or a light pen, an operator selects one or more of the displayed numbers to be dialed, step 204. The selected number or numbers are examined and modified, as explained in detail below, so that only "correct" phone numbers are dialed, step 206. By correct it is meant that the phone numbers are in a proper form according to specified constraints so as to increase the likelihood of establishing communication. The correct phone numbers are then passed to the dialer, step 208. The dialer, operating according to its own software program, then dials the numbers, step 210. As indicated by the dashed line 212, without the examining and modify of the selected phone numbers, the selected numbers would be applied directly to the dialer.

In a preferred embodiment of the present invention, steps 202, 204, 206, and 208 are implemented in one software program. While the individual steps of displaying and selecting phone numbers using a CRT (steps 202 and 204, respectively), as well as the step of applying selected phone numbers to dialing devices (step 208), are well known and widely used, the examining and modifying of phone numbers per step 206 is not so well known or used. This may be because of the wide number of telephone systems in use and the varied dialing requirements on those systems.

In view of the above, the examining and correcting per step 206 should be performed using a dialing program that is easily modifiable to meet the constraints of the telephone system on which the phone numbers are to be dialed. One way of doing this is to implement step 206 using modifiable script files to define templates that control how various classes of numbers are to be handled. To assist in understanding script files, a sample script file is presented in FIG. 3. It will be assumed that the sample script file operates on a private telephone system in which a leading nine (9) must be dialed for a local call, a leading eight (8) must be dialed for a long distance call, and in which any four (4) digit number that does not begin with a 0, a 1, an 8, or a 9 signifies an internal phone number within the private system.

The sample script then has three classes of dialable numbers: Internal, Outside Local, and Long Distance. While many other classes, such as International, are possible, the sample script file is believed sufficient to enable those skilled in the applicable arts to implement those other classes as required. Each of the identified classes is proceeded by a semicolon (;). In the script file implementation presented in FIG. 3, everything on a line following a semicolon (;) is regarded as a comment. While comments are visible to a programmer they are ignored during operation of the script. Thus, the class identifiers only assist the programmer in interpreting the script file.

The sample script file also contains bracket pairs —[]— which enclose either a letter 'P', which represents a short pause, and/or one or more of the characters usually available on a twelve-button telephone touchtone keypad, specifically "0123456789#*". These characters are referred to hereinafter as dialable characters, i.e., characters that can be dialed. Each bracket pair represents one character from the set of characters within that bracket pair. For example "[01]" indicates one character that may be either a '0' or a '1'. Closely related to bracket pairs is the letter 'N'. 'N' represents any one of the dialable characters.

Immediately to the left of some bracket pairs are exclamation marks (!). These signify that the dialable characters within the adjacent bracket are an exclusion set, i.e., the character is not one of the characters within the adjacent brackets. For example, the "![0189]" in the second line of FIG. 3 indicates a single dialable character which is not a '0,' nor a '1', nor an '8', nor a '9'; "![0189]" is thus the same as "[234567 #*P]".

Any bracket pair or letter may be preceded by an integer which represents the number of times the bracket pair or letter is repeated. For example, the "3N" in line two of FIG. 3 represents three dialable characters, while "5![01]" would represent five dialable characters, none of which are a '0' or a '1'. Some applications, such as the script file of FIG. 3, may require a variable number of dialable characters. Colons (:), which designate inclusive variability, are used to indicate this. A colon (:) inserted between two integers means at least as many dialable characters as the first integer, but no more than the second integer. For example, the 0:1[1] of line 8 of FIG. 3 represents either the absence or the presence of a leading 1, while "7:10N"

would represent at least seven, but no more than ten, dialable characters.

The sample script file also includes the letters L and R, (with repeat count integers) which occur to the right of modify commands (=>). A repeat count integer plus L, or a repeat count integer plus R designate blocks of dialable characters measured from the left or right edge, respectively, of the input phone number. For example, the 4R on the third line of FIG. 3 designates the rightmost four digits of an input telephone number, while the 7L on line seven designates the leftmost seven digits. Consider an input phone number of 7-100-812-0000, 7L would designate 7100812, while 4R would designate 0000. The modify command (=>) divides the lines on which it occurs into two sections, referred to hereinafter as templates. All elements to the left of a modify command form a comparison template while all elements to the right form an output template. If a line does not contain a modify command, such as line two of FIG. 3, the elements of the comparison template also serve as an output template. Thus, each line of the script, except those starting with a semicolon (;), include a comparison template.

With knowledge of the elements of the script file of FIG. 3, its operation can be understood. Assume that a proposed phone number is input to the script file of FIG. 3. A determination is made as to which comparison templates matches the proposed number. If the matching comparison template is on a line having a modify command (=>), the proposed phone number is modified to match the elements of the output template on that line. If the matching comparison template is on a line without a modify command, the phone number is not modified. The modified phone number, if modified, or the original phone number, if not modified, is deemed to be correct and is then passed to the fax card for dialing. If the proposed phone number does not match one of the comparison templates, the number is deemed un-dialable. What happens then depends upon the system's program: warning lights, entry of the proposed phone number into an un-dialable number log, skipping of that number, or complete system shut down are among the multitude of possibilities.

An example may be useful in clarifying operation of the dialing program and its script file. Suppose that the system 2 of FIG. 1 is to fax a document to a remote unit having a phone number of 4158120000. Assume further that software causes the display 20 to show a set of telephone numbers per step 202 of FIG. 2, and that a system operator selects the desired phone number from that list, step 204. The selected number, 4158120000, is applied to the examining and modifying routine of step 206. Accordingly, the selected phone number is compared with the comparison templates of the script file of FIG. 3. The contents of line one, ";Internal" is bypassed since the semicolon (;) designates that line one is a comment line. Proceeding, the number—4158120000— does not match the comparison templates on lines two (more then four characters in the selected number), three (second digit of the selected number, '1', is not a 9 per the script file), and four (while first digit of selected number is a '4', the fourth digit is an '8', not a '4' as in the script file). Line five is bypassed as it is another comment line. The phone number also does not match the comparison templates on lines six (first digit of selected number is not a '9' as in the script file and the selected number has more then eight digits as required by the script file) and seven (the selected number has more then seven digits as in the script file).

However, the selected number does match the comparison template of line eight. While the first digit of the selected number is not a '1', the 0:1[1] implies that a '1' may or may not be the first digit. The first three digits of the selected number, 415, match the dialable character string: [4], [1], [5]. The fourth digit of the selected number is not a 0 or a 1, and thus the fourth digit matches ![01]. Finally, the last six digits of the selected number match 6N (which would be true for any 6 dialable characters). Since the phone number matches the comparison template on line eight, the modify command (=>) causes the selected number—415812000000—to be modified to have a leading 9, followed by a pause, and then followed by the seven right most digits of the selected phone number (8120000). Thus, the selected number is modified to 9 [pause] 8120000. The modified number is then applied to the fax card, step 208. The fax card, operating according to its own software program then dials the number, step 210.

While script files are readily understandable to software programmers, and while they provide great flexibility in interfacing diverse user requirements to a wide range of telephone system, they are likely to be a little too difficult for most users to implement. Therefore, it is beneficial to include a script writing program so that script files are automatically created after an operator answers a series of questions about his phone system and his requirements.

From the foregoing it is reasonable to assume that numerous modifications and variations of the principles of the present invention will be obvious to those skilled in its art. Therefore the scope of the present invention is to be limited only by the appended claims.

What is claimed is:

1. A method of modifying a proposed telephone number to enable communication using an automated dialer connected to a telephone system having specific dialing requirements, the method comprising the steps of:
    establishing a plurality of comparison templates comprised of comparison elements;
    establishing at least one output template comprised of output elements, said output template being associated with a first comparison template of said plurality of templates;
    determining if the proposed telephone number matches said comparison elements of said first comparison template; and
    modifying the proposed telephone number according to said output elements of said output template if the proposed telephone number matches said elements of said first comparison template.

2. The method according to claim 1, further including the step of dialing the modified telephone number.

3. An apparatus for modifying a proposed telephone number so as to assist in establishing communication between a local device having a dialer and a remote device by using a communication system having specified dialing requirements, the apparatus comprising:
    a first set of memory addresses storing a set of comparison templates, each template comprised of comparison elements for determining if the proposed telephone number has a specified form;
    a second set of memory addresses storing at least a first output template comprised of specified output elements;

means for associating a first comparison template of said set of comparison templates with said first output template;

means for comparing the proposed telephone number with the elements of said first comparison template to determine if the proposed telephone number matches said first comparison template; and means for modifying said proposed telephone number according to said output elements of said first output template if said proposed telephone number matches said first comparison template.

4. The apparatus according to claim 3 wherein said means for associating includes a central processor operating according to a software program.

5. A computer system of the type having of a central processing unit operating according to a software program, a memory device having addresses and storing a proposed telephone number, and a local dialing device for dialing input phone numbers, the computer system further comprising:

a first set of memory addresses storing a set of comparison templates, each template comprised of elements for determining if the proposed telephone number has a specified form;

a second set of memory addresses storing at least a first output template, said first output template comprised of specified dialing rules;

means for associating a first comparison template of said set of comparison templates with said first output template;

means for comparing the proposed telephone number with said first comparison template to determine if the proposed telephone number matches said first comparison template; and means for modifying the proposed telephone number if said proposed telephone number matches said first comparison template, the proposed telephone number being modified according to said first output template to produce a modified telephone number.

6. The computer system according to claim 5, further including a means for inputting said modified telephone number to the local dialing device.

7. The computer system according to claim 6 wherein said local dialing device is a facsimile machine.

8. The computer system according to claim 6 wherein said local dialing device is a modem.

9. The computer system according to claim 6 wherein said means for associating, said means for comparing, and said means for modifying include the central processing unit operating according to a software program.

* * * * *